Nov. 19, 1968  W. J. DE GAIN  3,411,469
APPARATUS FOR SECURING ENDS OF FLAT STRIP MATERIAL
Filed Jan. 3, 1966  8 Sheets-Sheet 1

INVENTOR
WILLIAM J. DE GAIN
BY
ATTORNEYS

Nov. 19, 1968  W. J. DE GAIN  3,411,469
APPARATUS FOR SECURING ENDS OF FLAT STRIP MATERIAL
Filed Jan. 3, 1966  8 Sheets-Sheet 2

INVENTOR
WILLIAM J. DE GAIN

BY

ATTORNEYS

Nov. 19, 1968   W. J. DE GAIN   3,411,469
APPARATUS FOR SECURING ENDS OF FLAT STRIP MATERIAL
Filed Jan. 3, 1966   8 Sheets-Sheet 4

INVENTOR
WILLIAM J. DE GAIN

ATTORNEYS

Nov. 19, 1968 W. J. DE GAIN 3,411,469
APPARATUS FOR SECURING ENDS OF FLAT STRIP MATERIAL
Filed Jan. 3, 1966 8 Sheets-Sheet 6

INVENTOR
WILLIAM J. DE GAIN
BY
ATTORNEYS

INVENTOR
WILLIAM J. DE GAIN
BY
ATTORNEYS

United States Patent Office 3,411,469
Patented Nov. 19, 1968

3,411,469
APPARATUS FOR SECURING ENDS OF
FLAT STRIP MATERIAL
William J. De Gain, Detroit, Mich., assignor to Koppy
Tool Corporation, a corporation of Michigan
Filed Jan. 3, 1966, Ser. No. 518,434
10 Claims. (Cl. 113—1)

ABSTRACT OF THE DISCLOSURE

A hydraulic press apparatus includes a stationary platen and a reciprocal ram adapted to carry a punch and die set between them. The ram is driven by a reciprocal platen which is supported on the opposite side of the stationary platen from the ram and is connected to the ram by tie rods. A power hydraulic cylinder is disposed between the stationary platen and the reciprocal platen and a pair of return cylinders connect the reciprocal platen to the frame of the press. A fluid control circuit is adapted to connect the power cylinder and the return cylinders so that fluid flows from the return cylinders to the power cylinder during the power stroke and in the opposite direction during the return stroke. Fluid flow out of the return cylinders to the power cylinder is metered until control of a rack and pinion arrangement which detects the relative positions of the ram and the stationary platen so as to maintain parallelism between the two. The fluid system includes means for reversing the flow between the cylinders upon the occurrence of a sudden pressure increase in the power cylinder at such time as it bottoms on the stationary platen. A latching mechanism prevents movement of the ram towards the stationary platen in the absence of a control signal and the position of the latch is a precondition to the movement of the ram.

The apparatus includes roller means for passing flat stock through the punch and die set, apparatus for securing coil ends together by first punching out tab openings in one strip and then using that strip as a female die, in cooperation with the punch, to form tabs in the other strip and lock them into the female tab openings, and scraper means adapted to remove any scrap material proceeding through the apparatus.

The invention relates to an apparatus for securing ends of flat strip material and particularly to an apparatus for interconnecting the trailing end of a metal strip or coil with the leading end of another metal strip of coil.

U.S. Letters Patent No. 3,130,490, issued Apr. 28, 1964, to the same inventor as the present application and assigned to the same assignee as the present invention teaches and claims a method of securing together the ends of long strips or coils of sheet metal and the like, which are desired to be continuously run through a stamping, pickling or painting operation, or any other operation in which long strips or coils of sheet material are continuously used.

The apparatus of the present invention is particularly well adapted for practicing the method referred to above by means of an improved press provided with a female die half on a fixed platen and with a male punch half on a reciprocating platen disposed above the fixed platen supporting the female die half. The female half and male punch halves cooperate to punch out tab openings in the end of one strip, while simultaneously shearing off the strip substantially proximate to the jagged end thereof, so as to provide in one strike tab openings and a straight clean end for the strip. The strip end, now provided with a straight clean edge and a series of tab openings aligned substantially along that edge and connected thereto by integral throat portions is clamped or manually held at position above the female die half. The leading end of a second strip or coil is placed above the end of the first strip, the apparatus is actuated a second time, thus causing the male punch to cut a clean edge having tabs which are cut out in cooperation with the end of the first strip provided with tab openings acting as a female die. The apparatus automatically provides for the male punch half pushing the tabs of the second strip into the tab openings of the first strip to a depth corresponding to the thickness of the individual strips so that the walls of the tab openings are caused to tightly grip the walls of the tabs as a result of the flowing or "spalling" of the materials being thus interconnected. The jagged end of the second strip which has thus been trimmed off rests upon the top surface of the first strip and is automatically scraped away by means of an angled scraper when the continuous strip or coil, resulting from the two joined strips, is further fed through the now opened throat of the apparatus. The joined strips or coils may thus be continuously run through a stamping, pickling or painting operation without interruption of production. As previously mentioned, the apparatus is provided with a stationary lower platen supporting preferably the female die half and with a reciprocable upper platen carrying the male punch half. The upper reciprocating platen is rigidly connected by means of at least two columns to a reciprocating intermediary platen disposed below, and a certain distance away from the stationary platen. Power hydraulic cylinders are disposed between the stationary platen and the reciprocating intermediary platen and when the hydraulic cylinders are extended they cause the auxiliary reciprocating platen to draw the reciprocable upper platen or ram towards the stationary platen. Below the intermediary reciprocating platen are disposed preferably two cylinder-piston assemblies for returning the intermediary platen to its original position, thus causing the reciprocable upper platen or ram to return also to its original position away from the stationary platen.

The bed of the machine is substantially wide, so as to permit joining substantially wide strips or coils, and the length of the machine is relatively short. In order to compensate for unequal loads which may tend to laterally cock the movable portions of the machine relative to the stationary portions thereof, which, in addition to causing inaccuracies in the machined parts, would result in imposing fatiguing stresses upon the elements of the machine and even cause the movable portions to bind relative to the stationary portions, and the punch and die set to be damaged. Means are provided to differentially regulate the hydraulic pressure in either one of the return cylinder-piston assemblies, so as to cause the reciprocable platen or ram to remain at all times substantially parallel to the stationary platen even when important loads are unequally applied on the side ends of the reciprocable platen or ram.

Consequently, the objects of the invention are to provide an apparatus for interconnecting the ends of two strips or coils by using a single male and female punch and die set which trims the edges of the strip ends and which provides a tab opening-tab interconnection between the trimmed strip ends; to provide an apparatus which is hydraulically operated for displacing the male punch half and the female die half relative to each other for effecting the trimming operation, and the tab opening-tab interconnection between the strip ends; to provide for interconnecting a great dimensional variety of strip widths within the maximum capacity of the apparatus; to provide for a safety latch preventing uncontrolled operation of the apparatus; and to provide for compensation of *uneven* loads being imposed upon the reciprocable platen of the apparatus which may tend to cause such reciprocable platen to loose its parallelism with the stationary platen.

The above and other objects and advantages of the invention will become apparent when the following description is considered in conjunction with the appended drawings wherein.

Referring now to the drawings, and more particularly to FIGURES 1–5 thereof, an apparatus according to the invention comprises a support frame 10 on which is bolted or otherwise fastened by means of bolts, such as bolts 11, a table or stationary platen 12. The support frame 10 defines two inverted Y-shaped leg members 14 and 16, and a cross-beam member 18 extends transversely from one leg member to the other, being adequately fastened thereto by welding, for example, for contributing to the over-all stiffness and sturdiness of the support frame assembly.

A reciprocable intermediary platen 20 is disposed below the stationary platen 12. The reciprocable intermediary platen 20 is stiffened by two laterally extending cross-beams 22 and 24 bolted or welded to the lower surface of the platen and held apart by means of longitudinally disposed vertical stiffening members 26, adequately bolted or preferably welded, to the inner sides of the cross-beams 22 and 24 and to the bottom surface of the platen.

Figure 5:
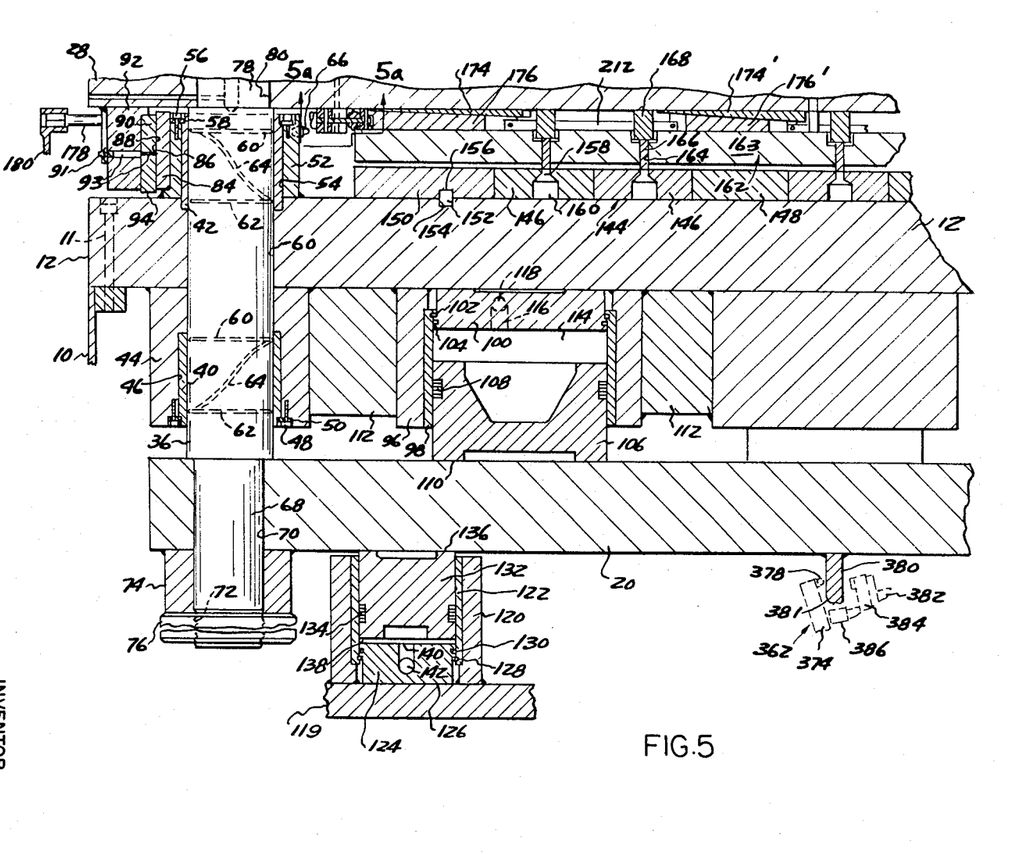
FIGURE 5 is a partial longitudinal cross-sectional view along lines 5—5 of FIGURE 3 and FIGURE 4.

Disposed above the stationary platen 12, there is a reciprocable platen or ram 28 extending the whole width of the apparatus in substantial parallelism with the stationary platen 12. The reciprocable ram 28 is stiffened by means of laterally extending cross-beams 30 and 32 extending from one side end to the other of the reciprocable ram and bolted or welded on the top surface thereof. The laterally extending cross-beams 30 and 32 are maintained apart by vertically disposed longitudinally extending stiffeners 34 having their end faces bolted or welded to the inner surface of the laterally extending cross-beams 30 and 32, and their lower faces preferably welded to the top surface of the ram 28. The reciprocable ram 28 is supported from the intermediary reciprocable platen 20 by symmetrically disposed relative to the centerline of the apparatus and each one of which, as best seen in FIGURE 5, is adapted to slide through bushings 40 and 42. Bushing 40 is mounted below the stationary platen 12 by being disposed within a support collar 44 welded to the lower surface of the stationary platen 12, being therein held in position by engagement in shouldered bore 46 of collar 44 and by being fastened therein by means of socket screws 48 and washers 50. In the same manner, bushing 42 is held in a collar 52 welded to the upper surface of stationary platen 12 and is held therein by being inserted in a shoulder bore 54 wherein it is fastened by socket screws 56 and washers 58. A bore 60 is provided through the stationary platen 12 to afford a passage to the rods 36 and 38.

Each bushing 40 or 42 is provided with annular lubricating grooves 60 and 62 and spiral lubricating groove 64, into which grease may be introduced by means of grease fitting 66. The lower end of each rod 36 or 38, as shown in details relative to rod 36 in FIGURE 5, is provided with a reduced end portion 68 adapted to pass through a bore 70 in the lower intermediary reciprocable platen 20. The reduced end portion of each rod is in turn provided with a threaded end 72 passing through a spacer ring 74 welded to the lower face of the intermediary reciprocable platen 20. A nut 76 fastens the rod in position by engaging the threaded end 72 thereof.

Figure 4:
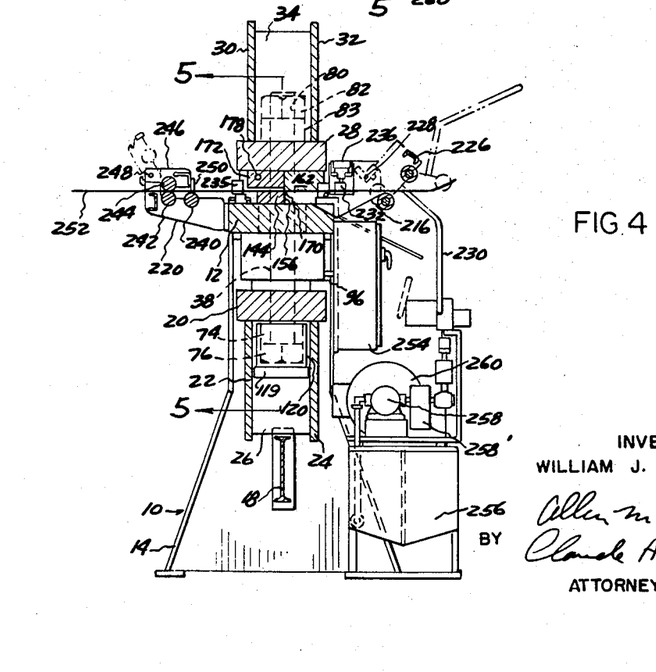
FIGURE 4 is a cross-sectional view thereof, substantially along line 4—4 of FIGURE 1.

The upper end of each rod 36 or 38 is rigidly fastened to the reciprocable ram 28 by being provided with a reduced diameter end portion 78 passing through a bore 80 in the ram and having a threaded end upon which is tightened a nut 82, a spacer ring 83 being disposed between the nut and the upper surface of the ram (see FIGURE 4).

Lateral play between the reciprocable ram 28 and the stationary platen 12 is taken by means of a first wear plate 84, FIGURE 5, held in an appropriate recess in the collar 52 and having a side surface 86 adapted to engage the side surface 88 of a second wear plate 90 inserted in an appropriate recess in a block 92 fastened by means such as welding on the bottom surface of the reciprocable ram 28. Adequate lubrication of the wear surfaces 86 and 88 is provided by grease introduced through fitting 91 and channels 93. The lower face 94 of the wear plate 90 is spaced a predetermined distance away from the upper surface of the stationary platen 12 so as to provide for means limiting the permissible amount of travel of the reciprocable ram 28 toward the stationary platen 12.

Figure 2:
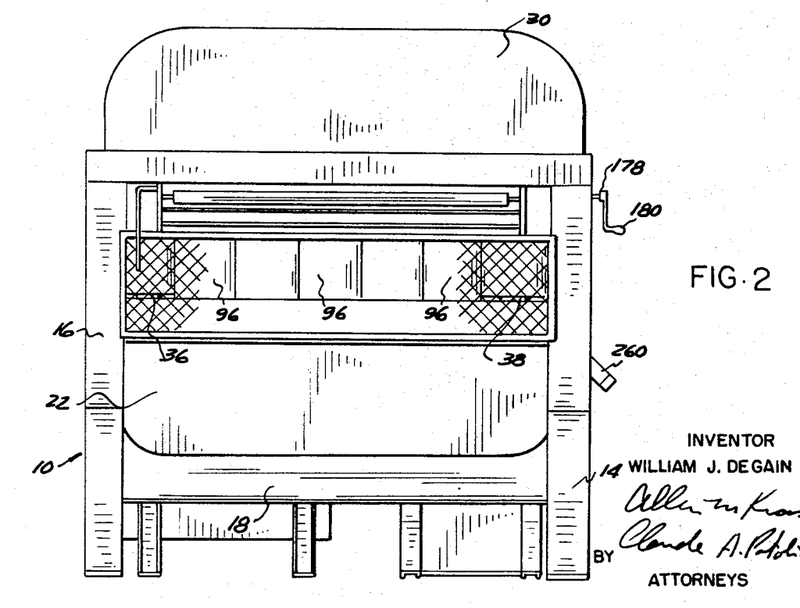
FIGURE 2 is a rear elevation view of the machine of FIGURE 1.

Between the lower intermediary reciprocable platen 20 and the stationary platen 12 are disposed three power cylinders, one of which only is shown in FIGURE 5 and is identified by reference numeral 96. The center power cylinder is located substantially at the centerline of the apparatus and the other two power cylinders are symmetrically arranged on both sides thereof, as shown in FIGURE 2. As illustrated in details in FIGURE 5, each power cylinder 96 is provided with an internal sleeve 98 and with a cylinder head 100 disposed below the stationary platen 12. Appropriate seals are provided between the cylinder head 100 and the sleeve 98 such as sealing ring 102 and O-ring 104 disposed in appropriate annular grooves. Adapted to reciprocate within each cylinder sleeve 98 there is a piston 106 provided with rings 108. The lower end 110 of the piston 106 abuts against the upper surface of the lower intermediary reciprocable platen 20. The several power cylinders 96 are held in position by being fastened to spacer blocks 112.

It can thus be seen that when pressurized fluid is introduced in chamber 114 situated between the top of piston 106 and the bottom face of cylinder head 100, such fluid being introduced through port 116 communicating with fluid channel 118, the flow of the pressurized fluid into chamber 114 tends to displace piston 106 downwardly, as seen in FIGURE 5, so that intermediary reciprocable platen 20 is also displaced downwardly. Consequently, reciprocable ram 28 is also displaced downwardly as a result of being fastened to intermediary reciprocable platen 20 by way of rods 36 and 38.

Between the lower surface of intermediary reciprocable platen 20 and a stationary plate or wall 119 supported by the apparatus frame 10 are disposed to two return cylinders, only one of which is shown in FIGURE 5 as identified by reference numeral 120. The two return cylinders are symmetrically placed relative to the centerline of the apparatus and each is located substantially in close proximity to each side end of intermediary reciprocable platen 20. The lower end of each cylinder 120 is secured to the upper face of stationary wall 119, and each cylinder is provided with sleeve 122 and with a cylinder head 124 having a lower face 126 abutting against the upper surface of the stationary wall 119, appropriate sealing ring 128 and O-ring 130 being disposed in adequate annular grooves so as to provide for a barrier preventing leakage of fluid to the ambient. Adapted to reciprocate within each sleeve 122 is a piston 132 provided with appropriate rings 134. The upper end 136 of each piston 132 is adapted to abut against the lower surface of the intermediary reciprocable platen 20.

It can thus be seen that when pressurized fluid is introduced into chamber 138 defined between the bottom of piston 132 and cylinder head 124, by way of port 140 in fluid communication with passageway 142, at the same time that fluid is exhausted from chamber 114 of power cylinder 96, the intermediary reciprocable platen 20 is caused to be displaced upwardly, as seen in FIGURE 5, so as to cause rods 36 and 38 to raise the reciprocable upper platen or ram 28. It can also be seen that pressurized fluid can be at all times present in chamber 138 so as to balance the weight of the reciprocable structure of the apparatus, consisting principally of the added weights of the intermediary reciprocable platen 20 of the rods 36 and 38 and of the upper reciprocable ram 28.

On the upper surface of the stationary platen 12, in the example of the apparatus shown herein, is placed a female die half, designated by reference numeral 144, which may consist of a plurality of die blocks 146 and spacer blocks 148 with appropriate indexing blocks such as 150 accurately positioned relative to the stationary platen 12 by means such as keys 152 disposed in appropriate keyways 154 and 156 disposed respectively on the upper surface of the stationary platen 12 and on the lower surface of the indexing block 150. Adequate hold down bolts or clamps (not shown) are provided for holding the female die half upon the stationary platen 12. The female die half 144 is provided with a shearing edge 156 (FIGURE 4) and by tab die openings 158 having enlarged portions 160.

The upper reciprocable ram 28 carries, attached to its lower surface, a male punch half 162 comprising a block 163 fastened thereupon by any conventional means such as pins and screws (not shown). The punch block 163 is provided with a plurality of openings or pockets 164 adapted to receive individual punches 166 in alignment with the female die openings 158. The individual punches are held in predetermined distance away from the lower face of the reciprocal ram 28 by means of spacer blocks 168 and are locked in the pockets 164 by any conventional holding means (not shown).

Figure 3:
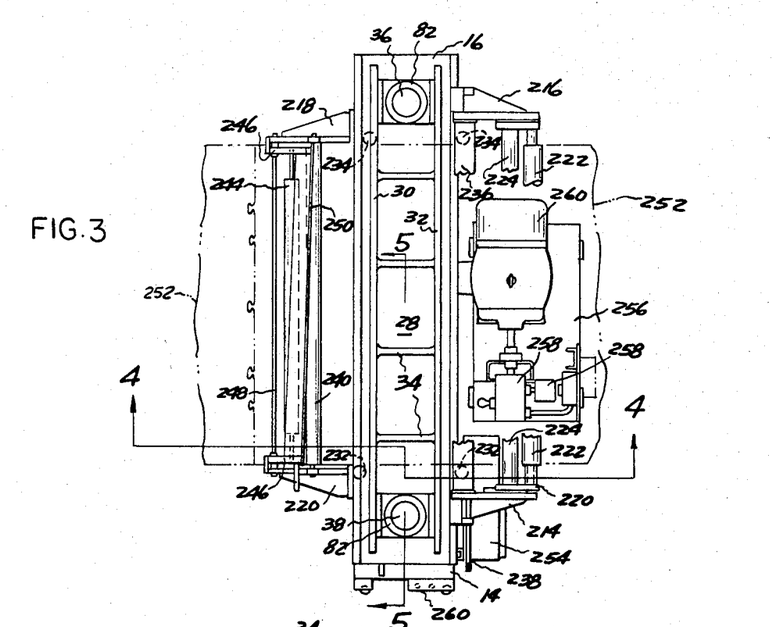
FIGURE 3 is a top plan view thereof.

In the example of female die half and male punch half shown, the punches 166 are adapted to cooperate with the die openings 158 in order to form appropriate tab openings at the end of one strip of material and by using such punched tab openings as if they were a female punch die half for the purpose of forming tabs on the end of another strip while simultaneously locking the tabs within the tap openings, thus tightly and accurately interconnecting the strip ends so as to form a continuous strip 252 (FIGURES 3 and 4). As best seen in FIGURE 4, the edge of the male punch half defines a shearing edge 170 adapted to trim along a straight edge the ends of the strips to be joined together, as is explained in further detail in the specification of U.S. Letters Patent No. 3,130,490.

On the underface of the reciprocable ram or platen 28 is resiliently mounted by means of springs and bolts (not shown) an appropriate stripper plate 172 which, in addition to the usual functions of such a plate, additionally acts as the means limiting the penetration of punch ends into the die opening so as to securely lock the tabs and tab openings of the strips being joined.

Figure 5A:
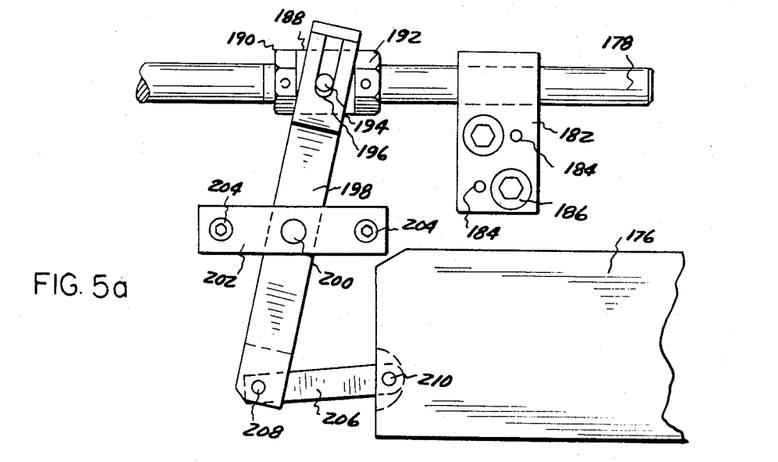
FIGURE 5a is a plan view of a portion of the machine as seen from line 5a—5a of FIGURE 5.

In order to make the apparatus adaptable to varied thicknesses of sheet stocks, and also in order to make the apparatus more uniformly adapted to varied thickness of punch die set assemblies, adjusting means are provided to controllably adjust the vertical position of the mounting block 162 carrying the punches and the stripper plate. As shown in FIGURES 5 and 5a, such adjusting means comprises a plurality of cooperating half wedge blocks such as half wedge blocks 174 and 176 interposed between the lower surface of the reciprocable ram 28, half wedge blocks 174 being stationary, and half wedge blocks 176 being adapted to be slidable toward the right or the left, as seen in FIGURE 5, so as to adjust the distance separating the lower surface of ram 28 from the upper face of block 162. An adjusting shaft 178 having a square end provided with a crank 180 is adapted to thread in and out through block 92 and through a support sleeve 182 (best seen in FIGURE 5a) fastened to the lower surface of the ram 28 by means of pins 184 and socket screws 186. The shaft 178 bears, proximate to the sleeve 182, a ring or sleeve 188 held in position by means of nuts 190 and 192. The sleeve 188 is provided with a pin 194 adapted to engage a slot 196 on the end of the fulcrum 198 pivotable around pin 200 carried by a pivot block 202 fastened to the lower surface of the ram 28 by means of screws 204. One end of a link 206 is mounted on the other end of the fulcrum 198 by means of pivot pin 208 and the other end of the link is pivotably connected to half wedge block 176 by means of pin 210.

When shaft 178 is rotated by means of crank 180, shaft 178 screws into or out of sleeve block 182, depending upon the direction of rotation of the shaft, and causes the ring or sleeve 188 to be longitudinally displaced, thus swinging fulcrum 198 around pivot 200. Half wedge block 176 is consequently displaced toward the left or the right, as seen in FIGURES 5 and 5a. As half wedge block 176, cooperating with stationary half wedge block 174, is connected by means of link bar 212 to half wedge block 176', cooperating with stationary half wedge block 174', and so on so forth, the total thickness of the full wedge block assembly consisting of all the pairs of half wedge blocks 176–174, 176'–174', etc., is thus adjustably variable and behaves as a variable thickness shim maintaining the punch supported block 162 a predetermined distance from the lower surface of the reciprocable ram. Appropriate graduations and inscriptions may be engraved on the stem of shaft 178 projecting from the block 192 so as to provide a means for determining with precision the thickness of the variable thickness shim.

Mounted on the front and rear of the stationary platen 12, by any conventional fastening means, are front brackets 214 and 216 (FIGURES 3 and 4), and rear brackets 218 and 220. Front brackets 214–216 support feed rolls 222 and 224 which are journaled on a roll support member 226 capable of swinging in relation to the brackets by being hinged thereupon by means of pivot 228. A lever 230 fastened to the roll support member 226 is adapted to manually pivot the roll support member 226 so as to guide the leading edge of the coil or strip of material fed through the punch and die set. Vertically disposed rolls 232 and 234 mounted on cross members 236 fastened to brackets 214 and 216 may be longitudinally displaced by means of a lead screw and cooperating nuts arrangement, or alternately by means of sprocket and chain (not shown) so as to be separated by a distance conforming to the width of the coil or strip being fed through the apparatus. Manual rotation of shaft 238 controls the distances separating the two vertical rolls 232 and 234.

Rear brackets 218 and 220 journally support output rolls 240 and 242. Disposed above roll 242 is a third roll 244 journaled on a swinging bracket 246 pivoting around pivot 248. On the front of bracket 246 is disposed an obliquely oriented scraper blade 250 adapted to scrape away scrap material remaining on the top of the sheet material 252 being fed through the apparatus. It can be seen that the height of scraper plate 250 is substantially self-adjusting, as a result of the pivoting mounting of the bracket 246, and the bracket 246 can be manually lifted so as to permit sheet stock material to be fed above rolls 240 and 242.

The apparatus also comprises an electrical cabinet 254 and a hydraulic system consisting essentially of a tank 256, pumps 258 and 258' and an electrical motor 260 driving the pumps. The hydraulic system also comprises the usual relief valves, and strainer with associated piping. Control for start and stop of the hydraulic pumps and other auxiliaries, and the pushbuttons controlling the operation of the reciprocating ram may be centralized on a box 260 placed in any convenient location such as on one side of the apparatus as shown.

Figure 1:
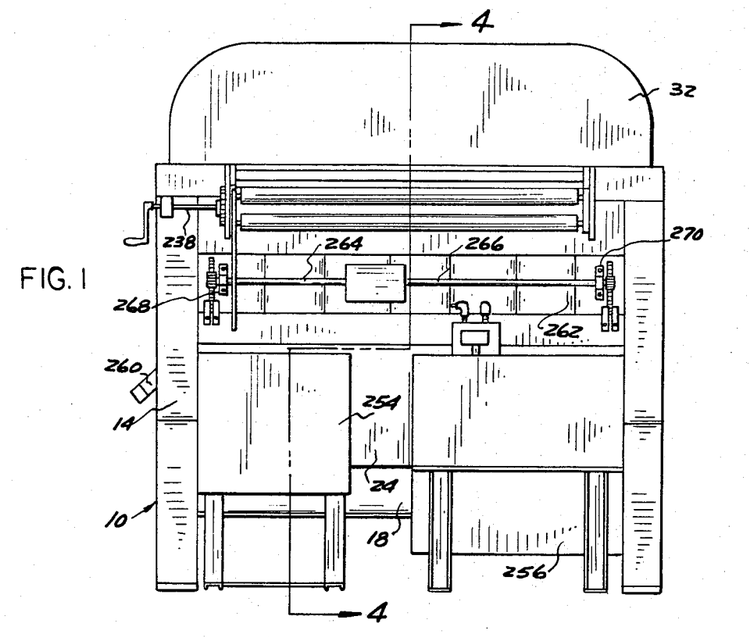
FIGURE 1 is a front elevation view of an example of a machine according to the invention.
Figure 6:
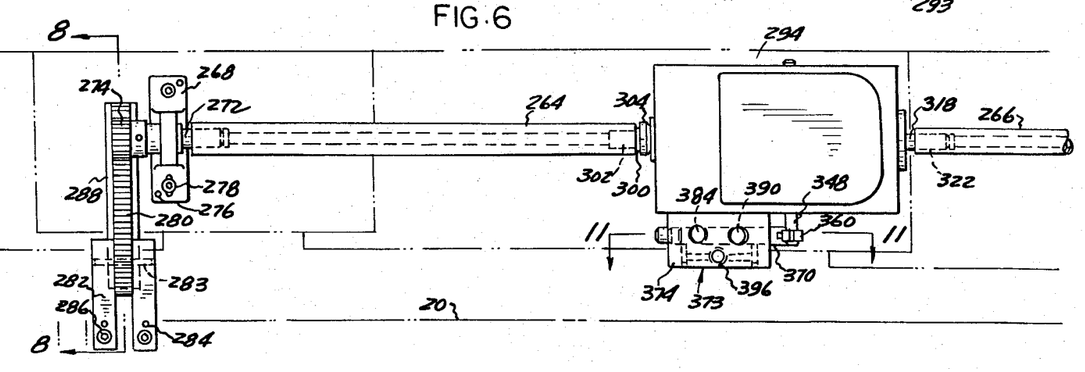
FIGURE 6 is a detailed elevational view of the control mechanism provided for insuring at all times substantial parallelism between the reciprocating and stationary platens of the apparatus of FIGURES 1–5.
Figure 7:
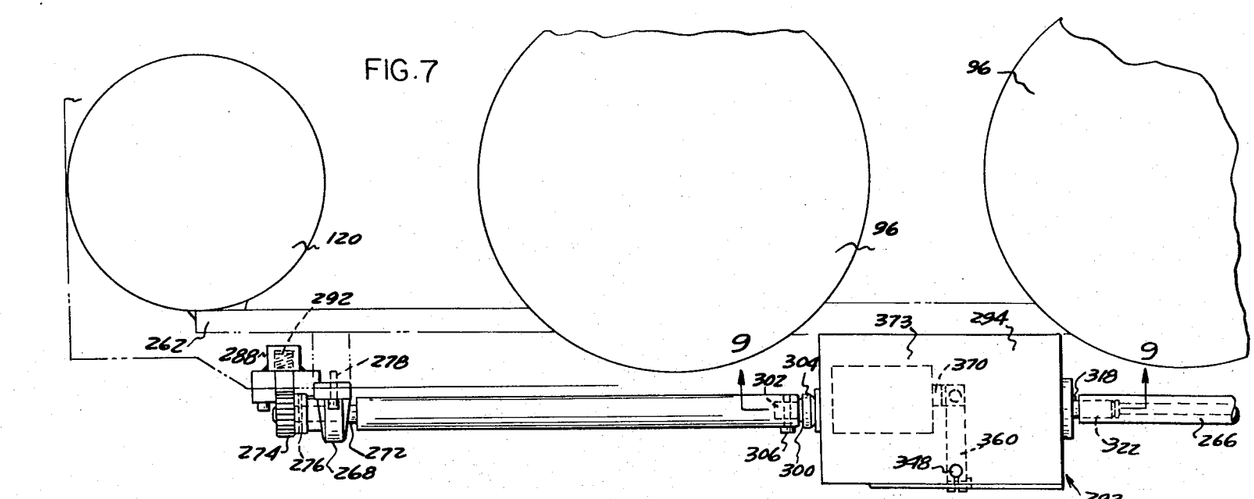
FIGURE 7 is a detailed plan view of the control mechanism of FIGURE 6.
Figure 8:
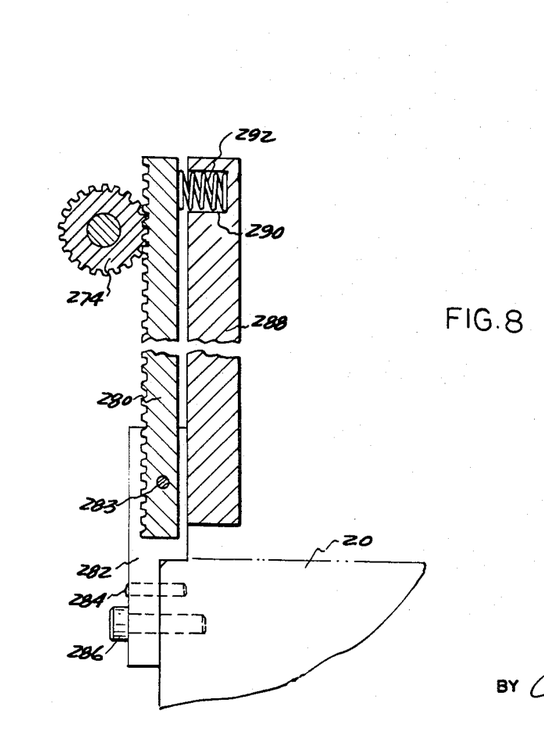
FIGURE 8 is a detailed view of a portion thereof as seen from the line 8—8 of FIGURE 6.

As shown in FIGURE 1, a plate 262 affixed to the frame of the apparatus supports two half hollow shafts 264 and 266, by means of pillow boxes 268 and 270. FIGURES 6–8 show the details of the assembly of the hollow half shaft 264 and of the function thereof. It is to be understood that the description of such an assembly and function is also applicable to hollow half shaft 266. It can be seen that pillow box 268 journally supports a stub shaft 272 having an end introduced into one end of the hollow half shaft 264 and welded or otherwise fastened therein, the other end of the stub shaft bearing a gear 274 keyed and otherwise fastened thereupon. The pillow box 268 is mounted upon the plate 262 by means such as dowel pins 276 and socket screws 278. A rack 280 meshing with the gear 274, is pivotably mounted by means of a pin 283 on a bifurcated bracket 282 which is in turn fastened by means of dowel pins 284 and socket screws 286 on the intermediary reciprocable platen 20. Behind the rack 280 is disposed an upright member 288 welded, or otherwise fastened, to the rear of the bracket 282 and disposed substantially parallel to the rack and which has a blind bore 290 formed in its upper end. A coil spring 292 is disposed in the blind bore 290 and presses upon the rear of the rack 280 so as to cause a preload bias forcing the teeth of rack 280 against the teeth of gear 274, thus compensating any backlash that could otherwise take place between the rack and the gear.

Figure 9:
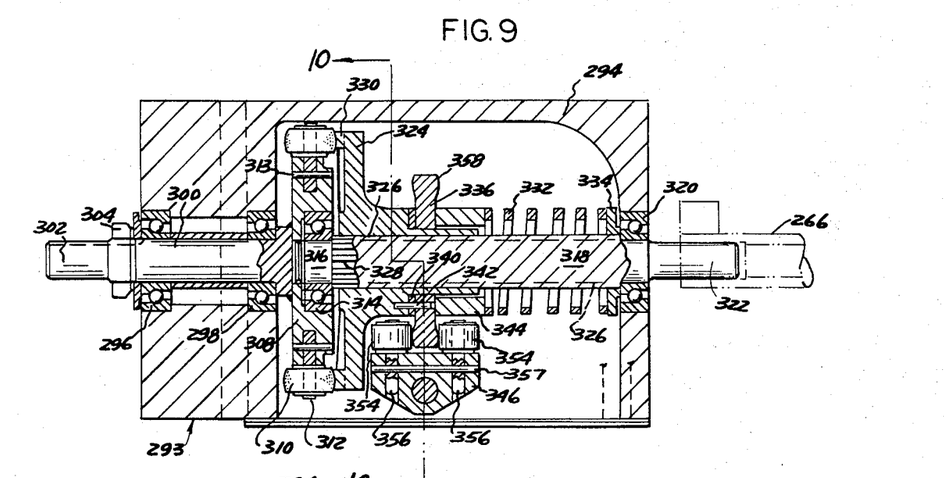
FIGURE 9 is a detailed cross-sectional view along line 9—9 of FIGURE 7.

A housing 294 is mounted on the plate 262 by any appropriate means such as being welded thereupon. Through the left side of the housing 294, as best seen in FIGURE 9, is journaled, by means of ball bearings 296 and 298, a stub shaft 300 provided with a threaded end 302 projecting from the housing. The threaded end 302 engages a correspondingly threaded portion on the end of the hollow half shaft 264, and a lock nut 304 securely locks the end of the stub shaft 300 in the end of the hollow half shaft 264. A screw 306 may be used to further secure the ends of the hollow half shaft and stub together (FIGURE 7).

Figure 10:
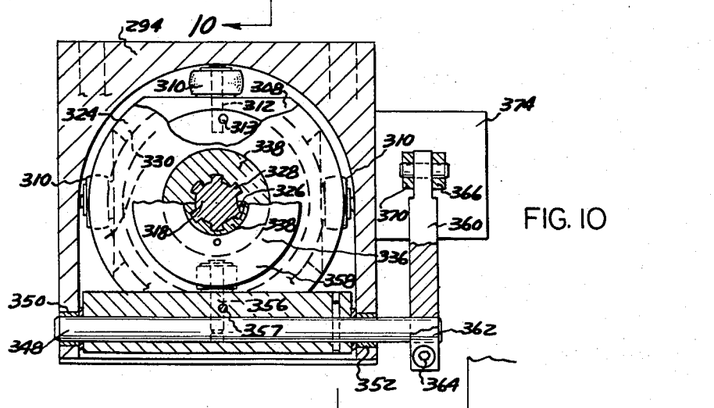
FIGURE 10 is a cross-sectional view along line 10—10 of FIGURE 9.

The other end of the stub shaft 300 projecting to the interior of the housing 294 carries a plate member 308 (FIGURES 9 and 10), supporting rollers 310 journaled on shaft 312 keyed or otherwise fastened, such as by pins 313, in appropriate apertures in the plate member 308. A shoulder-like cutout side portion of the plate 308 supports the outer ring of a ball bearing 314, the inner ring of which carries the end 316 of a splined shaft 318. The other end of the splined shaft 318 is journaled by means of ball bearing 320 and projects through the exterior of the housing 294, and the projecting end 322 is solidly fastened to the end of the hollow half shaft 266 in the same manner as previously explained in regard to the connection between hollow half shafts 264 and stub shaft 300. Disposed around splined shaft 318 there is a cam carrier 324 provided with keyways 326 adapted to engage splines 328 of splined shaft 318. The left hand side of cam carrier 324 as seen in the drawings, is provided with cam sloping surfaces 330 individually engaging at all times each one of the rollers 310 as a result of coil spring 332 disposed between the end of cam carrier 326 and a washer-like member 334 abutting against the inner race of ball bearing 322. The cam carrier 324 also supports an annular disc member 336 disposed in a groove formed on the outer surface of the body portion 338 of the cam carrier 324, preferably as shown in FIGURE 9. The annular disc member 330 is disposed in a cutout portion of the body portion 338 of the cam carrier 324, and a spacer ring 340 is used in cooperation with pins such as pin 342 for mounting the annular disc member 330 which is thus precisely laterally positioned and positively driven by the cam carrier 324, a sleeve or ring 344 being used to transmit the action of the coil spring 332 for normally biasing the cam carrier 324 to the left, so as to apply cam surfaces 330 against the rollers 310.

In the lower portion of the interior of housing 294 is disposed a swinging member 346 keyed on a suitable spindle 348 adapted to pivot through the walls of housing 294 by means of bearings 350 and 352. The swinging member 346 bears a pair of parallel rollers 354 freely rotating around normally vertically disposed shafts 356 held in position by means of pins 357. Each one of the rollers 354 is disposed on one side of the peripheral enlarged portion 356 of the annular disc member 336.

It can thus be seen that as long as reciprocable intermediary platen 20 reciprocates with both side ends thereof remaining at constant distance of the corresponding ends of the stationary platen 12, both gears 274 situated on the ends respective of hollow half shafts 264 and 266 are caused to travel the same distance along their respective racks 280 so the plate member 308 and cam carrier 324 are then caused to rotate in unison. However, if the reciprocable intermediary platen 20 is caused to lose its parallelism with the stationary platen 12 as a result of unequal side loads being applied to the two side ends of reciprocable ram 12, the two gears 274 do not any longer rotate in unison during a reciprocating stroke of the reciprocable ram and intermediary platen. Consequently, the two half shafts 264 and 266 do not rotate in unison, the plate member 308 and cam carrier 324 do not rotate in unison. The difference in rotational speed between the plate member 308 and the cam carrier 324 cause the rollers 312 to roll up or down, as the case may be, along the slope of cam surfaces 330, resulting in the cam carrier 324 being displaced either to the right as seen in FIGURE 9 in the event that half shaft 264 is rotating faster than half shaft 266, or to the left when the contrary condition is present.

Consequently, annular disc member 336 is also displaced either to the right or the left, causing swinging member 346 and shaft 348 to rotate respectively in a clockwise or counter-clockwise direction. Lever member 360 (FIGURES 7 and 10) mounted upon the shaft 348 by means of bifurcated end 362 and screw 364, is caused to swing to the right or the left, as seen in FIGURE 7, its other end formed carrying pin 366 projecting through an aperture 368 formed on the end of a valve body 370, displacing the valve body also toward the right or left, as seen in FIGURES 6–11.

Figure 11:
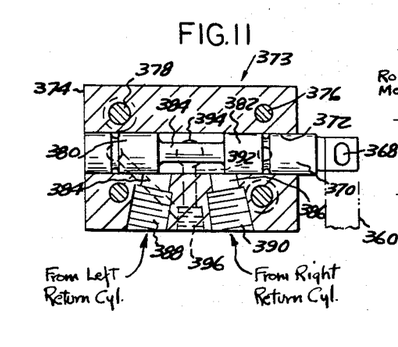
FIGURE 11 is a cross-sectional view of the control flow divider valve portion as seen from line 11—11 of FIGURE 6.

As best seen in FIGURE 11, the valve body 370 is disposed within a bore 372 in a valve housing 374 mounted upon the housing 294 by means such as pins 376 and socket screws 378. The valve body 370 is provided with two land portions 380 and 382 separated by a reduced diameter portion 484. When the valve body 370 occupies an intermediate or neutral position as shown in FIGURE 11, the land portions 380 and 382 obturate respective ports 384 and 386 leading into bore 372. Port 384 is in communication with an inlet 388 communicating with chamber 138 of the left return cylinder 120 by way of being connected to channel 142 (FIGURE 9). Port 386 is in communication with an inlet 390 in communication with chamber 138 of the right return cylinder in a similar manner. Chamber 392, disposed between portions 380 and 382, is at all times in communication with a port 394 connected to a passageway 396 connected to fluid return. Consequently, it can be seen that when valve body 370 occupies the position shown in FIGURE 11, during the return stroke of the reciprocating ram 12, fluid is being exhausted from the two return cylinders at an equal rate. If, on the contrary, as a result of the difference in rotation of the two gears 274, the swinging member 346 is actuated in one direction or the other, lever 360, in turn, displaces valve body 370 to the right or the left as seen in FIGURE 11. This results in either port 386 or port 384 being obstructed by land 382 or land 380, respectively, with the accompanying result that the fluid exhausting from either chamber 138 of the left return cylinder 120 or the right return cylinder is throttled down while the exhaust of fluid from the chamber of the other return cylinder is comparably increased, both flows of fluid being exhausted into annular chamber 392 in valve body 374 and from there to the fluid return through port 384. The difference in exhaust rates of the fluid from the chambers of the return cylinders tends to slow down the motion of one side of the reciprocable intermediary platen 20, consequently tending to slow down the motion of the corresponding side of the reciprocable ram 12, resulting in a torque force tending to reestablish parallelism between the reciprocable ram 28 and the stationary platen 12.

Figure 12:
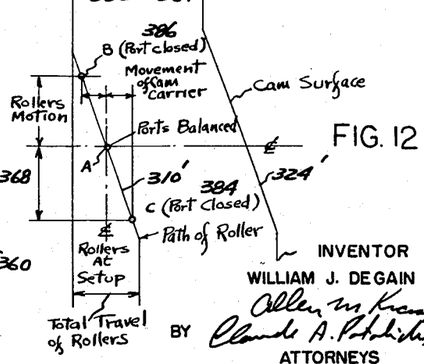
FIGURE 12 is a diagram useful in explaining the operation of the control mechanism of FIGURES 6–11.

FIGURE 12 shows diagrammatically how the travel of the rollers 310 upon the cam surfaces 324, being developed in FIGURE 12 as a contour 324', results in a similar roller path curve 310'. When the rollers are set up at intermediate point A, the openings of ports 384 and 386 are balanced as a result of valve body 370 occupying the intermediary position shown in FIGURE 11. When the rollers occupy the position B, port 384 is fully open and port 386 is fully closed. For any intermediate position of the rollers relative to the cam surface slope, port 384 is more open than port 386. When the rollers occupy any position between A and C, port 386 is progressively more open than port 384 until the rollers occupy position C, in which event port 386 is fully open and port 384 is fully closed.

Figure 13:
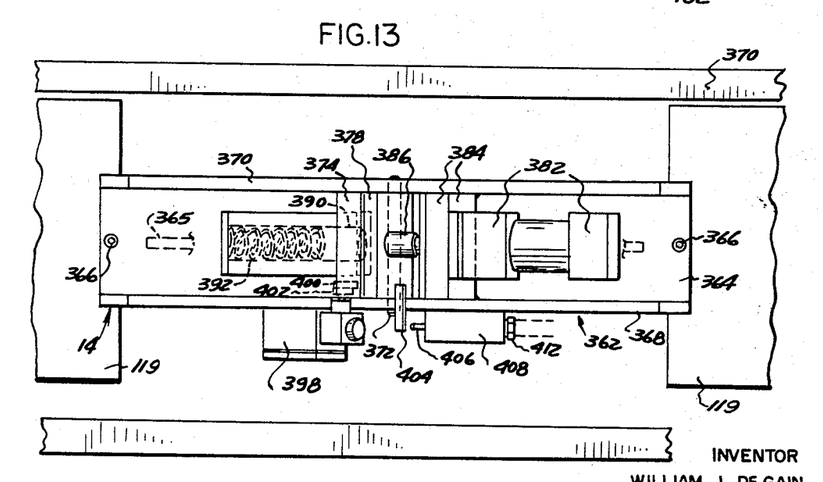
FIGURE 13 is a detail plan view of an example of a safety latch mechanism incorporated in the apparatus of the invention.

As shown in FIGURE 5, and more particularly in FIGURES 13 and 14, there is, disposed below the intermediary reciprocable platen 20 and situated between that platen and stationary plate 119, a latch mechanism designated generally by numeral 362. The latch mechanism 362 is supported by a plate member 384 reinforced by means of a rib element 365 welded to the lower surface of the plate member. The plate member 364 is mounted upon the stationary plate 119 by means of any conventional fastener such as bolts or socket screws 366. The plate number 364 is provided with two side plates 368 and 370 fastened thereon by any conventional means such as welding.

The side plates 368 and 370 fixedly support a pivot pin 372 extending laterally therebetween pivot pin 372 further extending through a non-circular elongated bore 376 provided on the end of a latch block 374. The upper end, as seen in FIGURE 14, of the latch block 374 has a roll 378 welded on one side thereof. A spacer block member 380 is welded to the lower surface of the reciprocable intermediary platen 20 and is provided on its edge corresponding to roll 378 of latch block 374 with a beveled portion 381. A hydraulic actuator 382 mounted upon a mounting plate 384 fastened in turn to the plate member 364 is disposed on the right side, as seen in FIGURES 13 and 14, of the latch block 374. The hydraulic actuator 382 is provided with a reciprocating roll 386 having an end 388 adapted to engage the right side of the latch block 374.

Figure 14:
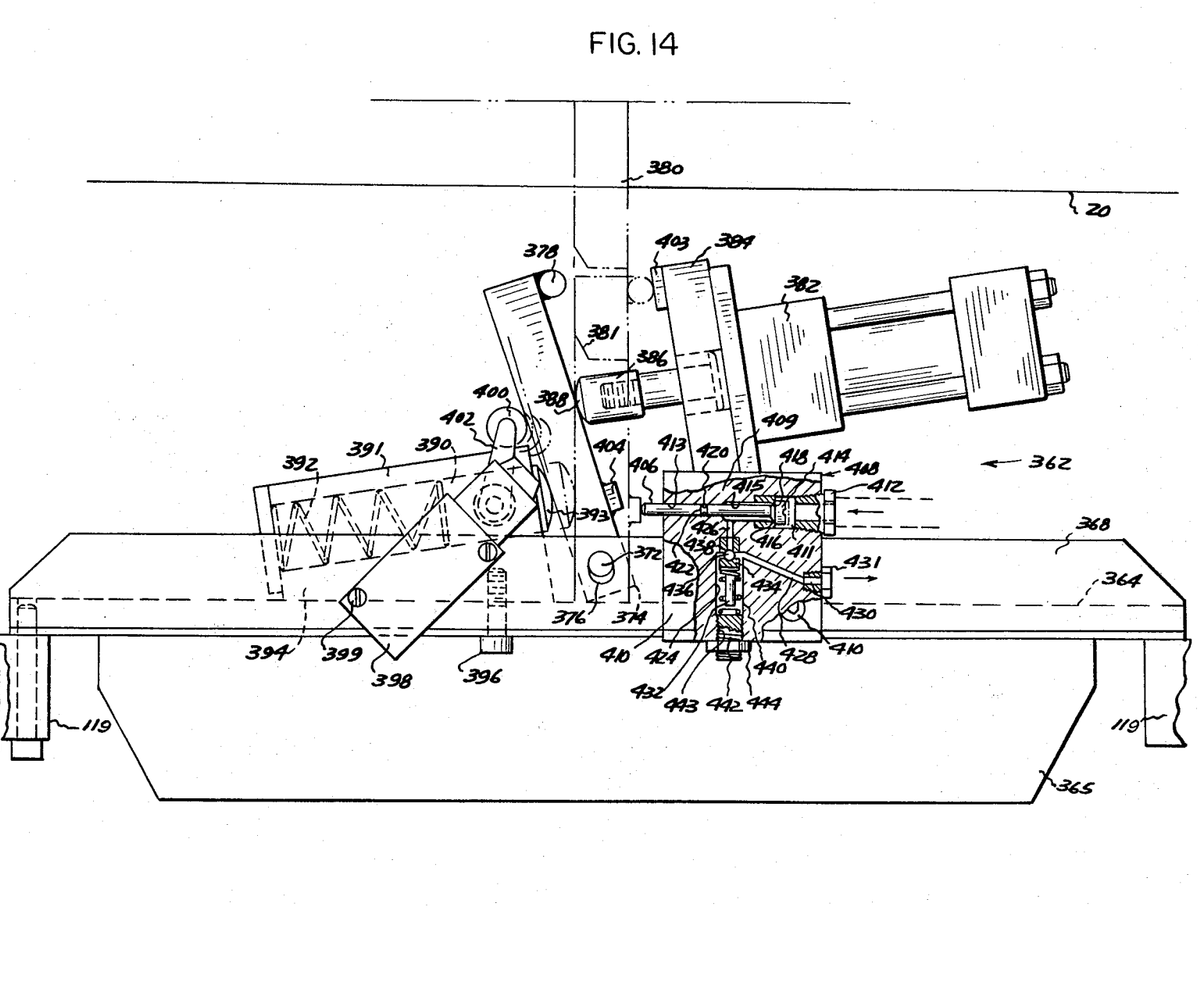
FIGURE 14 is an elevation view of the latch mechanism as seen from line 14—14 of FIGURE 13 with some portions broken away to show the internal construction.

The latch block 374 normally occupies the position indicated in dot and dash lines in FIGURE 14, and upon actuation of the hydraulic actuator 382, the rod 386 engages the right side of the latch block 374 and displaces it to the position shown in full lines in the drawings, out of the way of spacer block member 380, thus permitting the reciprocable intermediary platen 20 to be displaced toward the stationary plate 119. The swinging of the latch block 374 towards the left, as seen in the drawings, is effected against the biasing action of a plunger 390 to the right, as seen in the drawing, so as to apply the end 393 of the plunger against the left face of the latch block 374. The housing 391 is mounted upon a mounting block 394 which is in turn fastened to the plate member 364 by means such as socket screws 396.

The non-circular bore 376 enables the lower end of the latch block 374 to engage the upper surface of the plate 364 when in the position indicated in phantom in FIGURE 14, thus preventing any load from being applied to the pin 372 in the unlikely event that complete loss of hydraulic pressure causes the reciprocable ram to shift toward the stationary platen, thus forcing the lower end of spacer block member to engage the upper end of latch block 374. Latch block 374 is designated so as to be capable of carrying the whole weight of the reciprocable portion of the apparatus, if so necessary.

As soon as the latch block 374 reaches the position indicated in full line in FIGURE 14, the left face of the latch block 374 trips a limit switch 398 fastened to the outside of the side plate 368 by means of screws 399. The limit switch 398 is provided with a roller 400 adapted to engage the left face of the latch block 374 so as to actuate the lever 402 which in turn trips the switching mechanism of the limit switch. The limit switch 398 is electrically connected to the solenoid of a four-way valve which is adapted to control the inlet and exhaust of pressure fluid into and from the power cylinders 96 and return cylinders 120, as will be explained hereinafter in further details. It can thus be seen that the reciprocable ram 12 of the apparatus cannot be actuated unless the latch block 374 has been previously displaced to the position indicated in full lines in FIGURE 14.

Displacement of the hydraulic actuator rod 386 to the right, as seen in the drawings, results in the latch block 374 being urged back toward the position indicated in dot and dash lines in FIGURE 14 under the action of the spring biased plunger 390. Bevel 381 on the lower left corner of spacer block member 380, in cooperation with roll 378 on the end of latch block 374 acts in somewhat smoothing out the rightward motion of the latch block 374 under the action of spring biased plunger 390. As soon as the latch block 374 occupies the position indicated in dash and dot lines in FIGURE 14, as a result of spacer block member 380 having been returned to the position indicated in dot and dash lines in FIGURE 14, at the end of the return stroke of the ram 12, roll 378 is caused to abut against abutment 403 provided on the left side of the hydraulic actuator mounting block 384. A cross bar member 404 attached to the right side of the latch block 374 engages the projecting end of rod 406 adapted to control the function of a pilot valve designated generally by reference numeral 408. Pilot valve 408 comprises a housing 409 mounted upon side plate 368 by means such as screws 410. The housing 409 has a bore 411 formed therein, provided with a hydraulic fitting 412 for connection to the hydraulic system of the apparatus as will be explained hereinafter in further details. Rod 406 is slidably disposed in a bore 413 aligned with the bore 411. Bore 413 has an enlarged diameter portion 415 leading into bore 411. Rod 406 has an enlarged diameter head 414 projecting into bore 411, the head 414 and the body of the rod being connected by way of a frusto-conical portion 416. The frusto-conical portion 416 of rod 406 is adapted to engage a seat 418 so as to cut off bore 411 from bore 415. Rod 406 is further provided with a groove 422 in which is disposed an O-ring 420, or the like, to prevent leakage of fluid to the outside of the housing.

A second bore 424 has one end placed in communication with the enlarged diameter portion 415 of bore 415 by way of a channel 426. Bore 424 is at all times in communication with an outlet 430 provided with a fitting 431 for connection to a pipe (not shown) for returning hydraulic fluid to the tank (not shown). Within the bore 424 is slidably disposed a plunger 432 provided with a head portion 434 adapted to engage a ball 436 being normally biased against a seat 438 under the action of a coil spring 440 disposed around the body of the plunger 432 with one end engaging the bottom face, as seen in the drawing of the enlarged head 434, the other end of the spring 440 abutting against the face of a threaded member 442 adapted to thread within threaded end 433 of the bore 424. A lock nut 444 locks the threaded member 442 once a preload has been established upon the ball 436 by adjustably displacing the threaded member 442 into or out from the housing 409. As a result of the preload upon ball 436 urging it towards seat 438, channel 426 is normally cut off from channel 428 until a hydraulic pressure in channel 426 is able to counter-balance the preload upon the ball and lift it up from its seat.

As long as latch block 324 occupies the position indicated in full lines of FIGURE 14, cross-bar member 404 is out of engagement from the end of rod 406 and the hydraulic pressure existing in bore 411 applied on the right hand face, as seen in the drawing, of rod head 414 urges the frusto-conical portion 416 of the rod against the seat 418. Under these conditions, no hydraulic fluid is allowed to flow from bore 411 to 415. When the latch block 474 occupies the position indicated on the drawing in dot and dash lines, cross-bar member 404 engages the end of rod 406, displacing it to the right of an amount sufficient to lift the frusto-conical portion 416 from seat 418. Hydraulic fluid is thus allowed to flow from bore 411 to bore 415 and from there into channel 426. As soon as the pressure of the hydraulic fluid present in channel 426 reaches a valve sufficient to lift ball 436 from seat 438 fluid is allowed to flow from channel 426 into channel 428 and from there to fluid return through port 430. Consequently, the pressure of the fluid in bore 411 is reduced to a value corresponding to the preload imposed upon ball 436. This results in a drop of the hydraulic system pressure from any preset high value to a preset low value, as determined by the spring preload on ball 436, thus further inhibiting the hydraulic system and preventing it from operating the power cylinders as soon as the latch block 374 of the latch mechanism 362 occupies the locking position indicated in dot and dash lines in FIGURE 14.

Figure 15:
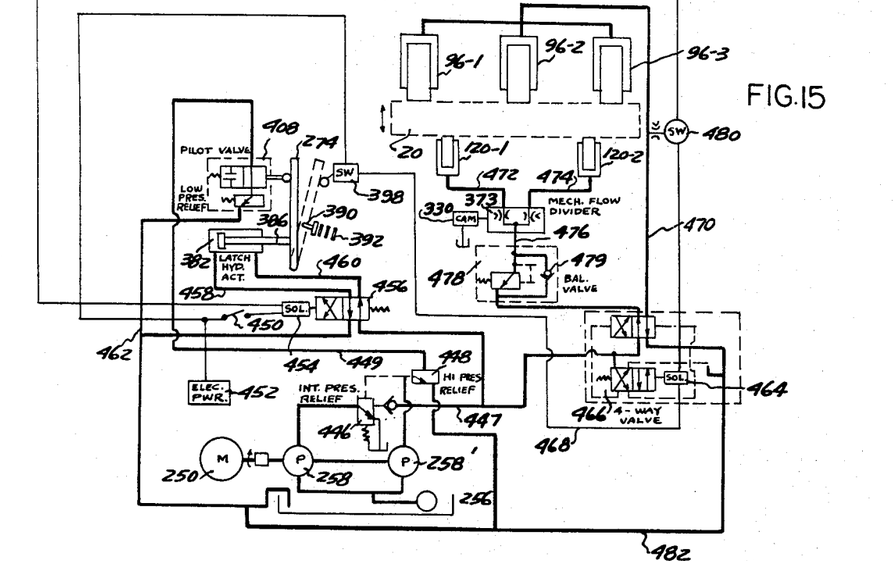
FIGURE 15 is a simplified electrical and hydraulic diagram of the apparatus of the invention.

The operation of the apparatus will now be explained with reference to FIGURE 15 showing a simplified electrical and hydraulic diagram thereof. Hydraulic fluid contained in tank 256 is pressurized by means of pumps 258 and 258' driven by electric motor 216, to pressures of, for example 600 p.s.i. and 2600 p.s.i. respectively, as set by respective intermediate pressure valve 446 and high pressure relief valve 448. Fluid at the intermediate pressure is led to a line 447 and fluid at the high pressure is led to a line 449.

In order to start a machining cycle, switch 450 is actuated so as to connect an electric power source 452 across a solenoid 454 which actuates a valve 456 so as to introduce fluid at the intermediate pressure of 600 p.s.i. from pipe 447 to pipe 458 connected to one end of latch hydraulic actuator 382. At the same time valve 456 exhausts fluid from the other end of latch hydraulic actuator 382 to return manifold 462. This results in rod 386 of latch hydraulic actuator 382 displacing latch block 374 until the latter trips limit switch 398. Limit switch 398 is electrically connected to solenoid 464 of four-way valve 466 by means of electric line 468. Valve 466 introduces fluid from intermediate pressure line 466 by way of pipe 470 into the three power cylinders 96–1, 96–2 and 96–3. Consequently, intermediary reciprocable platen 20 is displaced downwardly, as seen in FIGURE 15, and fluid present in return cylinders 120–1 and 120–2 is exhausted by means of pipes 472 and 474 respectively to the flow divider valve 373 controlled by means of cams 330 detecting, as explained hereinbefore, lateral cocking or walking of reciprocable intermediary platen 20. From the flow divider valve 373 fluid exhausts via conduit 476 to a balance valve 478 set at predetermined pressure, such as for example 225 p.s.i., so that the return cylinders 120–1 and 120–2 are at all times supplied with fluid under this lower pressure, in order to apply a force upon the reciprocable platen 20 substantially balancing the weight of the reciprocating portion of the apparatus.

When the reciprocable intermediary platen 20 which, as previously explained, is rigidly interconnected with the reciprocable ram of the apparatus, reaches a predetermined position corresponding to its maximum downstroke travel, the stripper plate engages the top surface of the material stock being operated upon, the back-up springs of the stripper plate, which is part of the male punch half mounted to the lower surface of the reciprocable ram, are compressed until the back of the stripper plate engages solid abutments preventing further downward motion of mounting block fastened to the ram. This results in a sudden stoppage of the ram and a sudden increase of the pressure of the fluid in the power cylinders 96, designated in FIGURE 15 as 96–1, 96–2 and 96–3. As the power cylinders are in fluid communication with conduit 470, the resulting sudden increase of pressure of the fluid in conduit 470 actuates pressure switch 480 in fluid communication therewith, and pressure switch 480 disengages solenoid 464 and solenoid 454 electrically connected thereto. The disengagement of solenoid 464 causes the valve 460 to exhaust fluid from power cylinders 96–1, 96–2 and 96–3 into return manifold 482, while at the same time placing balance valve 478 in communication with the 600 p.s.i. line 447. Such a pressure of the fluid lifts ball 479 of balance valve 478 from its seat, and the fluid is caused to flow into conduit 476 and is re-introduced into return cylinders 120–1 and 120–2, thus returning the intermediary reciprocable platen 20 to a position that causes the reciprocable ram rigidly attached thereto to be returned to a position away from the stationary platen, as previously explained in details. The de-energization of solenoid 454 by pressure switch 480 causes latch hydraulic actuator 382 to be actuated so as to retract rod 386. Latching block 274 is returned to the position indicated in full lines under the action of spring biased plunger 390, thus triggering pilot valve 408 which dumps the pressure existing in conduit 449 connected thereto from 2600 p.s.i. to 250 p.s.i. The hydraulic system is consequently rendered unable to actuate the cylinders 96–1, 96–2 and 96–3 for lack of sufficient hydraulic pressure in the system, while maintaining enough pressure in the return cylinders to substantially equilibrate the weight of the reciprocable portion of the apparatus.

A subsequent machining cycle is initiated by again actuating switch 450 so as to again energize solenoid 454 in order to repeat the sequence of events just precedingly explained.

It is evident that many of the elements of the apparatus of the invention can be used in various degrees of combination and it is also evident that such elements as the mechanical fluid divider valve and control therefor can be used on any type of pressure fluid operated apparatus and where it is desired to prevent loss of parallelism between the moving and stationary positions of the apparatus. It is also evident that the latch mechanism can have many applications in varied types of hydraulic devices where some kind of a fool-proof safety latch device is desired to be incorporated.

It is also evident that the herein described example of fluid operated apparatus of the invention, although particularly well adapted to the type of operation consisting in joining ends of flat material stock by means of a plurality of aligned tab openings adapted to be securedly engaged by cooperating tabs, will be found by persons skilled in the art to have many other applications without departing from the spirit and scope of the appended claims.

What is claimed as new is:

1. An apparatus comprising in combination:
   a support frame;
   a stationary platen mounted on said support frame and adapted to carry the first half of a punch and die set on one side thereof;
   a stationary plate member mounted on said support substantially parallel to said stationary platen in spacial relationship therewith;
   a reciprocable platen disposed on the other side of said stationary platen and between said stationary platen and said stationary plate member;
   a reciprocable ram disposed on the side of said stationary platen carrying said first half of a punch and die set, said ram carrying the second half of said punch and die set;
   means interconnecting said reciprocable platen and said reciprocable ram so as to hold them in parallel relationship to each other;
   power cylinder means disposed between said stationary platen and said reciprocable platen;
   return cylinder means disposed between said reciprocable platen and said stationary plate member;
   control means adapted to introduce pressure fluid into said power cylinder means while exhausting pressure fluid from said return cylinder means so as to cause said reciprocable ram to be displaced toward said stationary platen, said control means being further adapted to exhaust pressure fluid from said power cylinder means while introducing pressure fluid into said return cylinder means for causing said reciprocable ram to move away from said stationary platen as soon as said reciprocable ram has reached a predetermined position of close proximity with said stationary platen;
   roller means adapted to support flat stock material being fed through said punch and die set;
   adjustable roller guide means adapted to be adjustable for varied widths of wide flat stock material; and
   diagonally disposed scraper means adapted to scrape away any scrap material proceeding through said apparatus.

2. An apparatus comprising in combination:
   a support frame;
   a stationary platen mounted on said support frame and adapted to carry the first half of a punch and die set on one side thereof;
   a stationary plate member mounted on said support substantially parallel to said stationary platen in spacial relationship therewith;
   a reciprocable platen disposed on the other side of said stationary platen and between said stationary platen and said stationary plate member;
   a reciprocable ram disposed on the side of said stationary platen carrying said first half of a punch and die set, said ram carrying the second half of said punch and die set;
   means interconnecting said reciprocable platen and said reciprocable ram so as to hold them in parallel relationship to each other;
   power cylinder means disposed between said stationary platen and said reciprocable platen;
   a pair of return cylinders disposed between said reciprocal platen and said stationary pipe member, symmetrically, at substantially equal distances from the center line of said apparatus; and
   control means adapted to introduce pressure fluid into said power cylinder means while exhausting pressure fluid from said return cylinder means so as to cause said reciprocable ram to be displaced toward said stationary platen, said control means being further adapted to exhaust pressure fluid from said power cylinder means while introducing pressure fluid into said return cylinder means for causing said reciprocable ram to move away from said stationary platen as soon as said reciprocable ram has reached a predetermined position of close proximity with said stationary platen, said control means further being arranged to differentially exhaust pressure fluid from said return cylinders so as to counterbalance any load unbalanced tending to disrupt parallelism between said reciprocal ram and said stationary platen during the power stroke.

3. An apparatus comprising in combination:
   a support frame;
   a stationary platen mounted on said support frame and adapted to carry the first half of a punch and die set on one side thereof;
   a stationary plate member mounted on said support substantially parallel to said stationary platen in spacial relationship therewith;
   a reciprocable platen disposed on the other side of said stationary platen and between said stationary platen and said stationary plate member;
   a reciprocable ram disposed on the side of said stationary platen carrying said first half of a punch and die set, said ram carrying the second half of said punch and die set;
   means interconnecting said reciprocable platen and said reciprocable ram so as to hold them in parallel relationship to each other;
   power cylinder means disposed between said stationary platen and said reciprocable platen;
   return cylinder means disposed between said reciprocable platen and said stationary plate member;
   control means adapted to introduce pressure fluid into said power cylinder means while exhausting pressure fluid from said return cylinder means so as to cause said reciprocable ram to be displaced toward said stationary platen, said control means being further adapted to exhaust pressure fluid from said power cylinder means while introducing pressure fluid into said return cylinder means for causing said reciprocable ram to move away from said stationary platen as soon as said reciprocable ram has reached a predetermined position of close proximity with said stationary platen;
   latch means comprising:
   a latching member normally in a first position whereby it is interposed between a stationary portion and a reciprocable portion of said apparatus so as to maintain said reciprocable portion away from said stationary portion;
   first control means adapted to swing said latching member to a second position permitting reciprocation of said reciprocable portion relative to said stationary portion;
   second control means engageable by said latching member upon reaching said second position, said second control means being adapted to actuate said reciprocable portion; and
   means returning said latching member to said first position upon said reciprocable portion being retracted to a predetermined position away from said stationary portion.

4. An apparatus comprising in combination:
   a support frame;
   a stationary platen mounted on said support frame and adapted to carry the first half of a punch and die set on one side thereof;
   a stationary plate member mounted on said support substantially parallel to said stationary platen in spacial relationship therewith;
   a reciprocable platen disposed on the other side of said stationary platen and between said stationary platen and said stationary plate member;

a reciprocable ram disposed on the side of said stationary platen carrying said first half of a punch and die set, said ram carrying the second half of said punch and die set;

means interconnecting said reciprocable platen and said reciprocable ram so as to hold them in parallel relationship to each other;

power cylinder means disposed between said stationary platen and said reciprocable platen;

return cylinder means disposed between said reciprocable platen and said stationary plate member; and control means adapted to introduce pressure fluid into said power cylinder means while exhausting pressure fluid from said return cylinder means so as to cause said reciprocable ram to be displaced toward said stationary platen, said control means being further adapted to exhaust pressure fluid from said power cylinder means while introducing pressure fluid into said return cylinder means for causing said reciprocable ram to move away from said stationary platen as soon as said reciprocable ram has reached a predetermined position of close proximity with said stationary platen, as signaled by a sudden increase in fluid pressure in the power cylinder which occurs when the reciprocable ram bottoms upon said stationary platen.

5. The apparatus of claim 2 wherein the first half of said punch and die set comprise:

a shearing edge disposed transversely substantially at right angle to the center line of said apparatus; and a plurality of aligned female die openings forming tab openings having substantially narrow throat sections connecting said tab openings to said shearing edge;

and wherein the second half of said punch and die set comprises:

a shearing edge adapted to cooperate with the shearing edge of said first half;

a plurality of aligned male punch members each one of which is adapted to cooperate with each one of said female die openings:

a stripper plate adapted to clamp a first sheet of flat stock material while the shearing edges of said first and second halves of said punch and die set trim the trailing edge of said first sheet while forming therein a plurality of aligned tab openings; and said stripper plate being further adapted to limit the travel of said first half toward said second half when a second sheet of flat stock material is disposed in overlapping relationship on the top of said first sheet so as to cause the trimmed edge of said first sheet to cooperate with the shearing edge of said second half and the male punch members to cooperate with the tab openings in said first sheet for forming a straight edge in said second sheet with a plurality of tab sections engaging said tab openings and being locked therein.

6. The apparatus of claim 3, wherein the first half of said punch and die set comprises:

a shearing edge disposed transversely substantially at right angle to the center line of said apparatus;

a plurality of aligned female die openings forming tab openings having a substantially narrow throat sections connecting said tab openings to said shearing edge;

and wherein the second half of said punch and die set comprises:

a shearing edge adapted to cooperate with the shearing edge of said first half;

a plurality of aligned male punch members each one of which is adapted to cooperate with each one of said female die openings;

a stripper plate adapted to clamp a first sheet of flat stock material while the shearing edges of said first and second halves of said punch and die set trim the trailing edge of said first sheet while forming therein a plurality of aligned tab openings; and said stripper plate being further adapted to limit the travel of said first half toward said second half when a second sheet of flat stock material is disposed in overlapping relationship on the top of said first sheet so as to cause the trimmed edge of said first sheet to cooperate with the shearing edge of said second half and the male punch members to cooperate with the tab openings in said first sheet for forming a straight edge in said second sheet with a plurality of tab sections engaging said tab openings and being locked therein.

7. The apparatus of claim 1 wherein the first half of said punch and die set comprises:

a shearing edge disposed transversely substantially at a right angle to the center line of said apparatus; and a plurality of aligned female die openings forming tab openings having substantially narrow throat sections connecting said tab openings to said shearing edge;

and wherein the second half of said punch and die set comprises:

a shearing edge adapted to cooperate with the shearing edge of said first half;

a plurality of aligned male punch members each one of which is adapted to cooperate with each one of said female die openings;

a stripper plate adapted to clamp a first sheet of flat stock material while the shearing edges of said first and second halves of said punch and die set trim the trailing edge of said first sheet while forming therein a plurality of aligned tab openings; and said stripper plate being further adapted to limit the travel of said first half toward said second half when a second sheet of flat stock material is disposed in overlapping relationship on the top of said first sheet so as to cause the trimmed edge of said first sheet to cooperate with the shearing edge of said second half and the male punch members to cooperate with the tab openings in said first sheet for forming a straight edge in said second sheet with a plurality of tab sections engaging said tab openings and being locked therein.

8. The apparatus of claim 3 further comprising:

third control means engageable by said latching member upon returning to said first position; and said third control means being adapted to reduce the pressure of the pressure fluid so as to render the apparatus incapable of being operated until said first control means has swung said latching member to said second position.

9. An apparatus for maintaining endwise parallelism between a substantially elongated stationary member and a substantially elongated reciprocable member, said reciprocable member being substantially parallel to said stationary member when at rest and subject to forces tending to destroy such endwise parallelism when in operation, said reciprocable member being caused to reciprocate toward said stationary member by way of fluid operated expandible power means cooperating with two fluid operated return means each one of which is disposed substantially proximate to the ends of said reciprocable member and both of which are adapted to reciprocate said reciprocable member away from said stationary member, said apparatus comprising:

first means detecting unequal linear displacement of the ends of said reciprocable member relative to the ends of said stationary member; and second means adapted to be operated by said first means upon detection of unequal displacement of said ends for differentially controlling the exhaust of fluid from said return means so as to cause unequal forces to be applied by said return means upon said ends for causing said reciprocable member to remain parallel to said stationary member.

10. The apparatus of claim 9 wherein:
said first means comprises:
a toothed rack carried by said reciprocable member on each end thereof;
a gear carried by said stationary member and engaging each said rack so as to be rotated thereby;
a plate member rotating in unison with one gear, said plate member being provided with at least one cam sloping surface disposed on one side thereof;
a roller carrier rotating in unison with the other gear, said roller carrier being provided with at least one roller engaging said cam surface; and
means biasing said plate member and said roller carrier toward each other, whereby as long as said plate member and said roller carrier rotates in unison said plate member and said roller carrier are maintained a predetermined distance apart by said roller engaging an intermediate portion of the sloping surface of said cam;
and said second means comprises:
lever means operated from a neutral position to a first direction when said plate member and said roller carrier are displaced toward each other and operated in a second direction when said plate member and said roller carrier are displaced away from each other, such relative displacement of said plate member and said roller carrier resulting from a difference in rotations thereof causing said roller to roll upon said sloping cam surface; and valve means operable by said lever means said valve means comprising an exhaust port connected to fluid return, and an inlet port connected to the exhaust of the other of said return means, differential throttling means for equally half covering both said inlet ports of an equal amount when said lever means is in said neutral position and for differentially progressively further covering one port while uncovering the other when said lever means is operated toward said first and second directions so as to differentially control the exhaust of fluid from each one of said return means for causing said return means to differentially apply unequal forces to the ends of said reciprocating member tending to reestablish parallelism between said reciprocating member and said stationary member.

References Cited

UNITED STATES PATENTS

| 336,604 | 2/1886 | Tweddell et al. | 100—2.69 |
| 1,887,038 | 11/1932 | Pearson | 72—453 |
| 2,328,258 | 8/1943 | Cannon | 100—269 |
| 2,405,640 | 8/1946 | Cannon | 100—269 |
| 3,118,407 | 1/1964 | Robb | 100—269 |
| 3,130,490 | 4/1964 | De Gain | 29—432 |
| 3,179,998 | 4/1965 | Lamb | 100—269 |

RICHARD J. HERBST, *Primary Examiner.*